Sept. 13, 1927.  T. H. BELL  1,642,194
RAT AND MINK TRAP
Filed Aug. 26, 1926   3 Sheets-Sheet 1
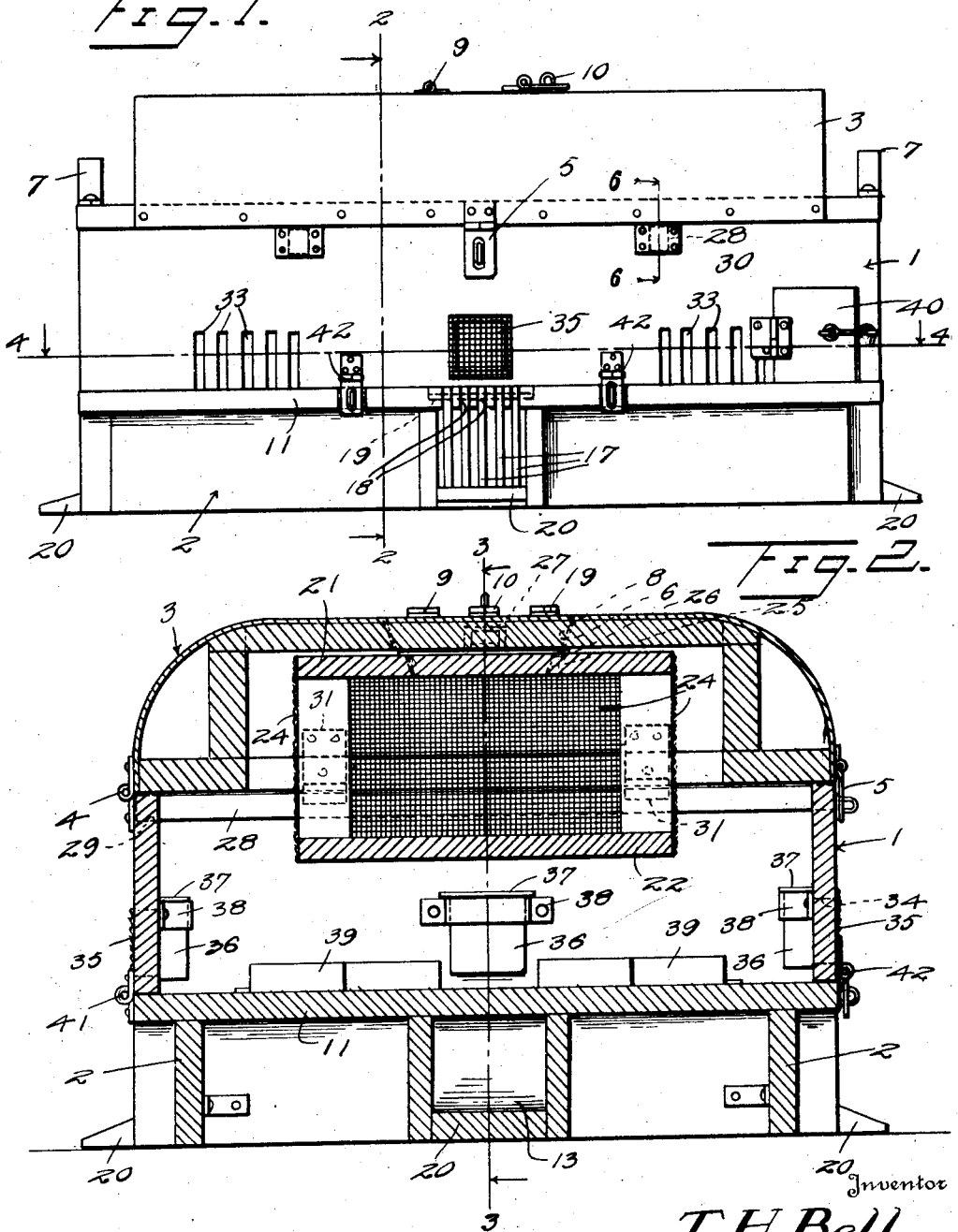

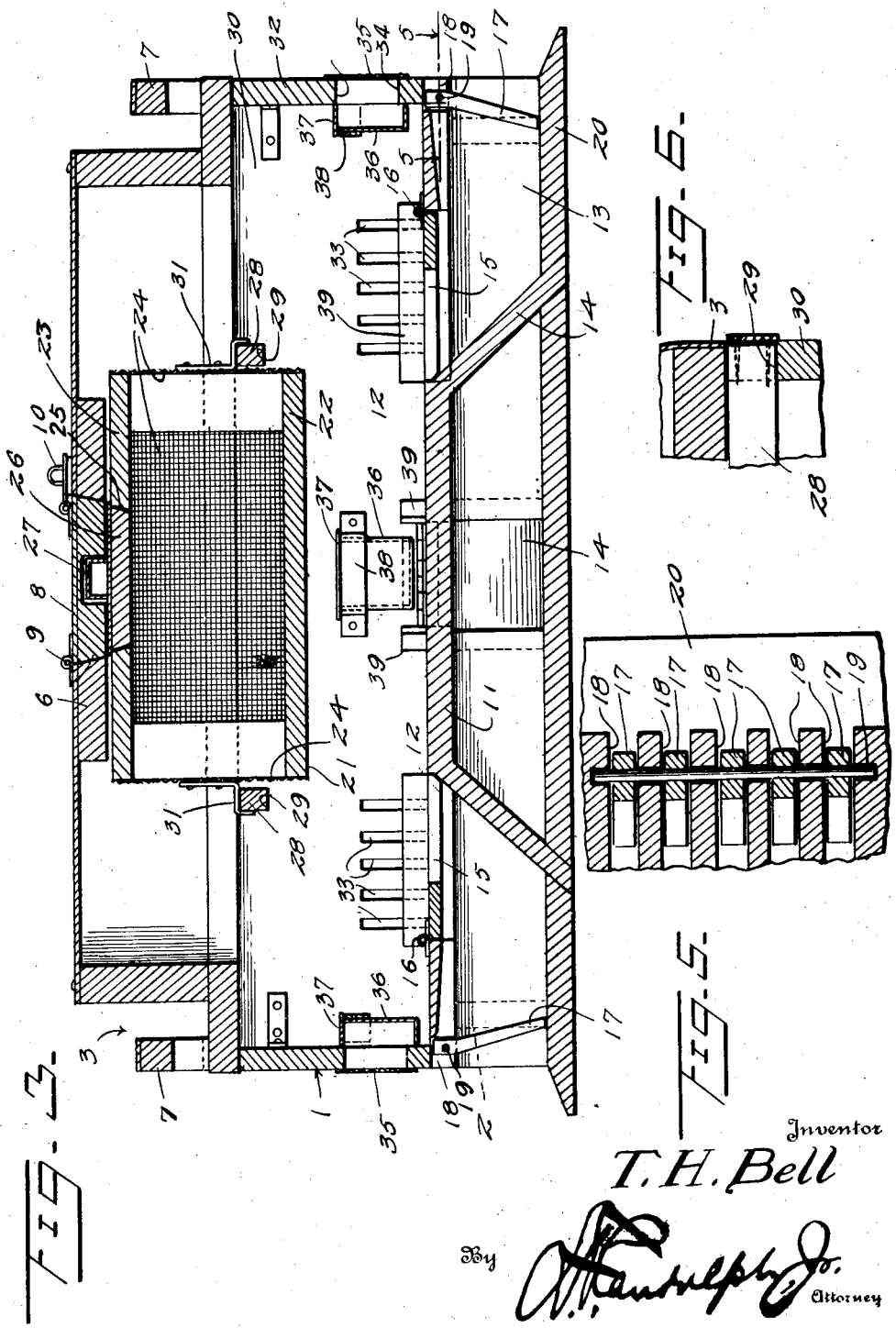

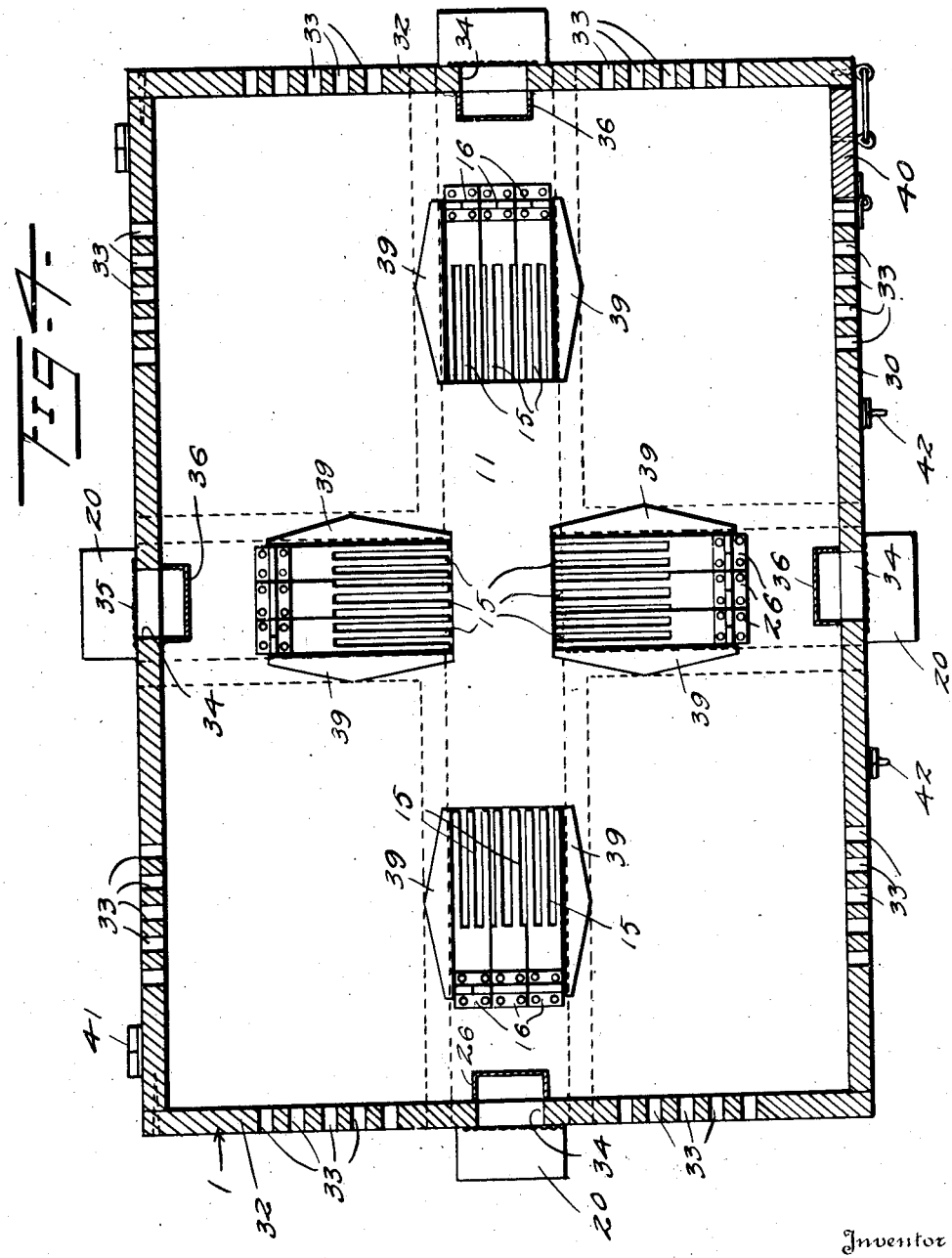

Patented Sept. 13, 1927.

1,642,194

UNITED STATES PATENT OFFICE.

THOMAS H. BELL, OF OAKLAND, CALIFORNIA.

RAT AND MINK TRAP.

Application filed August 26, 1926. Serial No. 131,672.

This invention relates to traps for rats, minks and other animals, and embodies the novel construction, combination and arrangement of parts hereinafter fully described and claimed, and illustrated in the accompanying drawings, wherein:

Figure 1 is an elevational view of an animal trap constructed in accordance with my invention, Figure 2 is a sectional view taken on the vertical plane indicated by the line 2—2 of Figure 1, Figure 3 is a sectional view taken on the vertical plane indicated by the line 3—3 of Figure 2, Figure 4 is a sectional view taken on the horizontal plane indicated by the line 4—4 of Figure 1, Figure 5 is a detail sectional view on an enlarged scale taken on the horizontal plane indicated by the line 5—5 of Figure 3, and Figure 6 is a detail sectional view taken on the vertical plane indicated by the line 6—6 of Figure 1.

Corresponding and like parts are referred to in the following description, and designated in the several views of the accompanying drawings, by similar reference characters.

The trap comprises a hollow body 1 which is mounted upon and secured to a base 2 and which is provided with a hollow cover 3. The base 2 is adapted to support the body 1 above the ground and is preferably hollow. The cover 3 is secured to the body 1 by hinges 4, and any suitable locking means such as that shown at 5 may be employed to secure the cover in closed position. In its top the cover 3 is provided with a centrally located opening 6, and at its ends it is provided with handles 7. The opening 6 is closed by a door 8 which is hinged as at 9 and secured in closed position by any suitable locking device such as that shown at 10.

The body 1 is provided in its bottom 11 with a plurality of entrance openings 12 with which the inner ends of passageways 13 communicate. The passageways 13 are formed in the base 2, and their inner ends are closed by upwardly and inwardly inclined walls 14 and their outer ends are fully open. The openings 12 are located directly above the inclined walls 14 of the passageways 13 in order to facilitate the entrance of an animal into the body. Guards 15 are provided for the openings 12 and are connected to the bottom 11 by hinges 16. The free ends of the guards 15 rest against the upper ends of the walls 14, and are mounted to swing upwardly to permit an animal to enter the body 1. The guards 15 are gravity actuated, normally occupying a closed position, and rapidly return to closed position after the entrance of an animal into the body 1. The outer ends of or entrances to the passageways 13 have arranged therein downwardly and inwardly extending and gravity actuated guards 17. These guards are pivoted at their upper ends in notches 18 by means of pins 19 and rest at their lower ends on the bottom 20 of the passageways 13. The guards 17 readily raise under the pressure exerted thereon by an animal entering the trap, and function to prevent the animal from retreating which as the result must pass to the body 1 through one of the openings 12. The guards 15 function to prevent the escape of the animal from the body 1.

The entrances 12 are grouped about the center of the body 1, and supported centrally within the body 1 above the bottom 11 thereof is a cage 21 for a chicken, bird or other suitable live bait. The cage 21 is provided with an imperforate bottom 22, an imperforate top 23 and perforated sides 24. The top 23 is provided with an opening 25 to permit the bait to be placed in or removed from the cage 21, and said opening is closed by a removable cover 26 provided with a handle 27. The cage 21 is located directly below the opening 6 in the cover 3, and due thereto the bait may be placed in or removed from the cage without opening said cover. As the cage 21 is supported above the bottom 11 of the body 1, and owing to the construction thereof the bait is protected from injury by the trapped animals. Bars 28 which extend across the trap and have their ends positioned in notches 29 formed in the upper ends of the sides 30 of the body 1, and brackets 31 secured to the cage 21 and engaging the bars 28, provide means for removably supporting the cage within the body.

The sides 30 and 32 of the body 1 are provided with openings 33 to permit the animals to scent the bait and which are too small to prevent the entrance of an animal or the escape of a trapped animal. Directly above the entrances to the passageways 13, the sides 30 and 32 are provided with openings 34 which are covered by wire cloth 35 and over which extend receptacles 36 for the reception of meat, cheese or other similar bait. The bait receptacles 36 are located within the body 1, and those sides thereof located next the walls 30 and 32 are fully open to permit the animals to scent the bait through the openings 34. The bait receptacles 36 are provided at their upper ends with extensions or flanges 37 by which they may be inserted in or removed from brackets 38 secured to the sides 30 and 32 of the body 1. The flanges 37 contact with the brackets 38 to support the bait receptacles 36 from the brackets. Guard strips 39 are secured to the top of the bottom 11 of the body 1 at opposite sides of the openings 12. One of the sides 30 of the body 1 is provided with a door 40 to permit of the removal of the trapped animals. The body 1 is hinged as at 41 to the base 2, and its free end is secured thereto by a locking device 42.

From the foregoing description, taken in connection with the accompanying drawings, it should be apparent that the trap is simple, durable and efficient, that it provides a plurality of novelly arranged and novelly guarded entrances for the animals, and that the arrangement of the bait cage 21 and bait receptacles 36 are such as to produce the best possible results. The animals may enter the trap from the various sides thereof, there is no possibility of their escaping from the trap, and there is no possibility of their consuming the bait. While the preferred embodiment of the invention is shown in the drawings, it is to be understood that such changes may be made when desired as are within the scope of the invention as claimed.

What is claimed is:—

1. A trap comprising a body provided with openings in its bottom, a base for supporting the body above the ground, entrance ways formed in the base and communicating at their inner ends with said openings, gravity actuated pivoted guards for said openings, and gravity actuated pivoted guards for the entrances of said passageways.

2. A trap comprising a body provided with openings in the bottom thereof, a base adapted to support the body above the ground, passageways formed in the base and communicating at their inner ends with said openings, the inner ends of said passageways being upwardly and inwardly inclined, gravity actuated guards for said openings pivoted to said bottom and resting at their free ends on said ends, and gravity actuated guards for the entrances to said passageways pivoted to said bottom and contacting at their free ends with the bottom of the passageways.

3. A trap comprising a body provided in the bottom thereof with entrance openings, guards for said openings, said body being provided in its sides with openings, perforated covers for the last named openings, bait receptacles extending over said last named openings, and means for removably supporting the bait receptacles in place.

In testimony whereof I affix my signature.

THOMAS H. BELL.